March 7, 1967 J. T. GULLIKSEN ETAL 3,307,246
METHOD FOR PROVIDING MULTIPLE CONTACT
TERMINATIONS ON AN INSULATOR
Filed Dec. 23, 1963 2 Sheets-Sheet 1

INVENTORS
JOHN T. GULLIKSEN
FRANK J. BOLDA
HERBERT J. HALLSTEAD
ALFRED E. OLDAKER
BY Robert Lieber
ATTORNEY

United States Patent Office 3,307,246
Patented Mar. 7, 1967

3,307,246
METHOD FOR PROVIDING MULTIPLE CONTACT TERMINATIONS ON AN INSULATOR

John T. Gulliksen, Peekskill, and Frank J. Bolda, Herbert J. Hallstead, and Alfred E. Oldaker, Poughkeepsie, N.Y., assignors to International Business Machines Corporation, New York, N.Y., a corporation of New York Filed Dec. 23, 1963, Ser. No. 332,442
4 Claims. (Cl. 29—155.55)

This invention relates to a method for securing conductive members to a supporting structure so as to provide integral spherical protuberances on said members which secure said members to said structures and which permit electrical contact to be made with similar integral protuberances to close spacing tolerances.

The subject method is particularly, but not exclusively, applicable to the mass formation of stacked arrays of miniature circuit modules. In the past, it has been customary to provide contact structures in stacked printed circuit arrays and the like by affixing additional structures or coatings to the ends of flexible circuit leads and by thereafter deforming the additional structures or coatings to fill substrate apertures through which the leads have been extended. While this technique is adequate for those applications in which the contact structures are used solely to establish eletcrical connections, it proves to be inadequate for applications wherein the contact structure also serves as a spacing element for establishing or conforming to a requirement for a predetermined precise spacing between vertically stacked planar circuit modules or the like. It is also noteworthy that the additional step required for the affixing of the additional structures or coatings to the leads adds an additional complication and expense to the overall assembly process by means of which a complete stacked array is formed.

Accordingly, an object of this invention is to provide a method for forming mechanically secure electrical contact structures extending from an insulating substrate which, in addition to establishing electrical circuit connections, are also capable of being formed to precise dimensional tolerances so as to act as spacing members relative to neighboring substrates in a densely packaged array.

Another object is to provide a method of forming a mechanically secure contact termination of precisely controllable dimensions integral with the end of a conductive lead attached to the surface of a supporting substrate; said contact being thereby useful for establishing electrical connections between said lead and other leads extending to other substrates, as well as for determining the spacing between said substrate and said other substrate.

Still another object is to provide a more reliable and efficient method of mass producing a densely packed array of planar circuit modules with precisely determined spacings between adjacent modules.

The invention is primarily based on the well known principle that the end of a conductor when heated to the fluid state tends to bunch into spherical configuration having a diameter greater than the diameter of the conductor. The invention is further based on the recognition that the size of such a spherical configuration can be precisely controlled by heating a predetermined length of the conductor extending from the surface of a non-wettable insulating substrate, while clamping the conductor so as to prevent movement of the conductor toward the source of heat. By precisely controlling the diameter of the spherical protuberance formed at the end of the conductor, the resulting electrical contact structure can be used not only to provide a base for making electrical contact to other circuits but also to provide a precisely determined spacing between the substrate from which it extends and a neighboring substrate. It should be appreciated that such precisely determined spacing is particularly advantageous in the formation of stacked arrays of microminiature circuit modules, and also in the formation of contact configurations in which selective connections are established; for example, a configuration of contacts having complementary dimensions. According to a preferred embodiment, a stacked array of microminiature planar circuit modules is formed by extending a plurality of conductive leads, which incidentally may have different diameters, through corresponding apertures preformed in a planar substrate, so that a predetermined volume of conductive material extends from the substrate at each aperture location. The extending portions of the leads are then heated to the fluid state so as to form integral spherical contacts protuberances of predetermined diameter, after which connecting contacts of neighboring planar substrates are joined in a single welding or soldering operation to form a stacked combination having predetermined spacing between the planar substrates. In those positions where the contact protuberances are required to form bridging or jumper structures for by-passing circuit elements on a given planar substrate, but not to make contact to an adjacent substrate, the diameters of the anchoring protuberances are made less than the predetermined spacing between substrates by appropriately controlling the amount of conductive material extending from the substrate prior to the application of heat to form the contact protuberance. In order to insure the formation of a truly spherical contact protuberance it is necessary to employ a substrate which cannot be wetted by the conductive material comprising the contact lead, as otherwise the conductor would tend to spread and flow along the surface of the substrate while in the fluid state. So long as the length of extending lead which is subjected to heating is held constant, the diameter of the resulting spherical protuberance is predetermined, providing that the applied heat is not sufficient to cause evaporation or deterioration of the conductive material.

It should be further noted that by forming integral contact structures as described above, there is no resistive interface at the juncture of the contact structure and lead, whereas a resistive interface is invariably formed when a dissimilar metal solder is joined to a conductive lead. The presence of numerous resistive interfaces in a large array of printed circuits is of course an undesirable condition which is advantageously avoided by the technique described herewith.

The foregoing and other objects and features of the invention may be more readily appreciated and carried into effect by considering the following detailed description thereof with reference to the accompanying drawing wherein.

Figure 5:
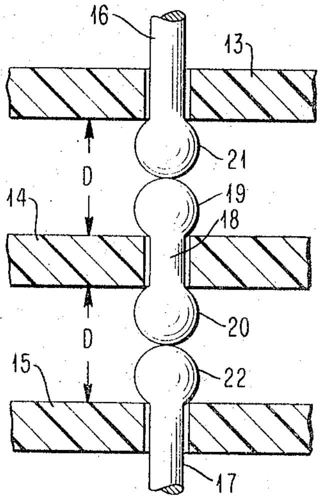
Figure 6:
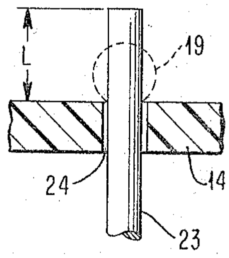
Figure 7:
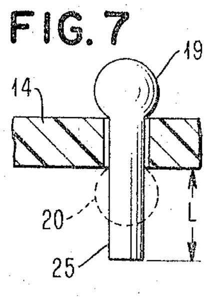
Figure 8:
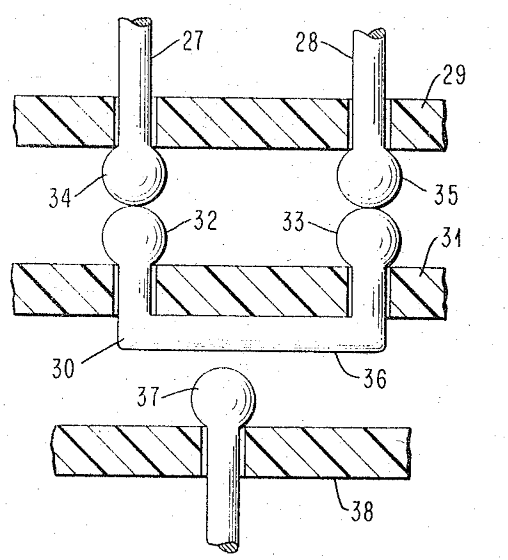
Figure 9:
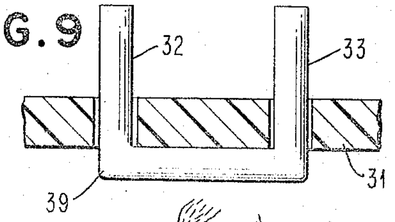
Figure 10:
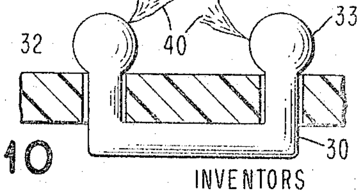
Figure 11:
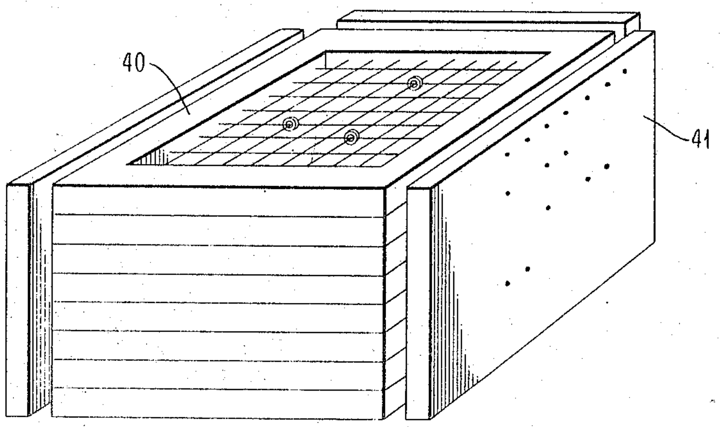
Figure 13:
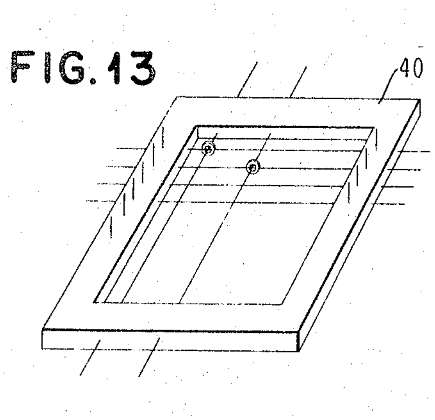
Figure 12:
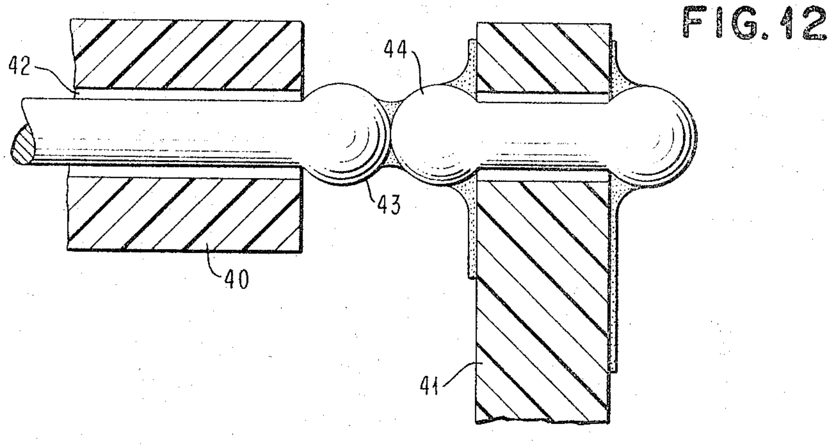

FIGURES 5 to 7 indicate steps involved in the formation of one type of contact protuberance arrangement useful for making through connections between adjacent successive planar substrates in a densely packed array of precisely positioned planar circuit modules;

FIGURES 8 to 10 indicate steps involved in the formation of another type of contact protuberance configuration useful for establishing bridged connections between points on a single planar substrate within a stacked array; and FIGURES 11 to 13 indicate steps involved in the formation of a complete stacked array of planar circuit modules having selectively predetermined spacings and electrical connections between planar substrates.

Figure 1:
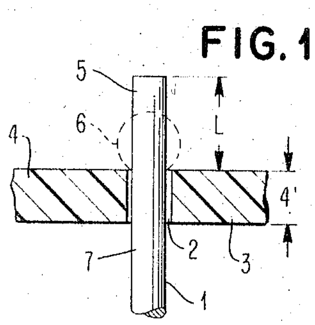
FIGURE 1 shows a section of a supporting substrate having a predetermined volume of a conductive lead member extending through an aperture therein, and also shows in dotted outline the resulting spherical contact protuberance of predetermined diameter formed at the end of the lead member by application of a predetermined amount of heat thereto.

Referring to FIGURE 1, if a predetermined length L of a conductive lead 1 is extended through an aperture 2 in a substrate 3 having a surface 4 which cannot be wetted by the material comprising the conductor 1, and if a predetermined quantity of heat is controllably applied to cause the extending portion 5 of the conductor 1 to assume the fluid state, the resulting contact structure will be substantially spherical in shape as indicated by the dotted outline at 6, and the volume of this spherical protuberance will be identical to the volume of the extended lead portion 5 providing that the remainder of the lead 1 indicated generally at 7 is held clamped during the application of heat to the end portion 5. If the aperture 2 is suitably dimensioned it is quite apparent from the illustration in FIGURE 1 that upon cooling of the spherical contact protuberance 6, the lead 1 cannot be withdrawn through the aperture 2 and is thus securely anchored to the substrate 3.

Were it not for the clamping of the lead portion 7, upon application of heat to the end portion 5 of the lead, the spherical portion 6 would tend to grow and draw the portion 7 into the growth whereby the resultant diameter of the protuberance 6 would be indeterminate. A twofold advantage is derived from the formation of an integral protuberance of predetermined diameter in this manner. First, the predetermined diameter of the protuberance, shown at 6 in FIGURE 1, is useful for establishing a predetermined spacing between neighboring planar substrates, as well as electrical circuit connections between substrates; and second, the protuberance being integral with the lead, there is no resistive interface formed at the end of the lead although an interface would be formed if a low temperature solder were employed.

Figure 2:
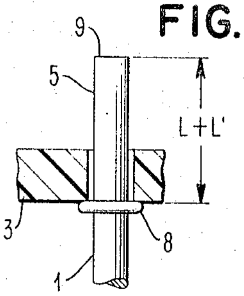
FIGURES 2 to 4 illustrate various techniques for holding a conductive lead member, such as that shown in FIGURE 1, in place during the formation of a spherical contact protuberance integral with the end thereof, so as to prevent movement of the lead during the heating of the end thereby permitting precise determination of the diameter of the spherical protuberance.
Figure 3:
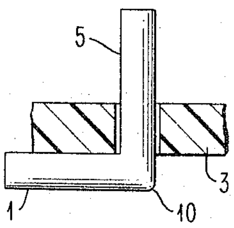
Figure 4:
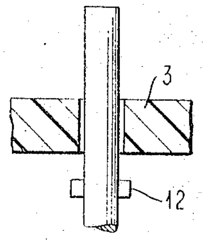

In order to clamp the member 1 in FIGURE 1 so as to prevent consumption of the unextended portion 7 during heating of the extended portion 5, a number of different techniques may be employed as indicated in FIGURES 2 to 4. In FIGURE 2 the lead 1 is shown with a preformed upset, or shoulder 8, located at a distance $L+L'$ from the end 9 of the extended lead portion 5, where L′ represents the thickness of the substrate 3. The lead 1 is extended through the aperture in the substrate 3 until the upset rests against the underside of the substrate and the extended end portion 5 is then heated to produce the required spherical contact protuberance of predetermined diameter. If desired, the required length $L+L'$ between the end 9 and the upset 8 can be obtained by first inserting a longer length of lead until the upset 8 rests against the underside of substrate 3 and then cutting the extending portions 5 at the appropriate position 9, to establish the predetermined length $L+L'$.

In FIGURE 3, the lead 1 is shown provided with a bend or crimp as at 10 and in FIGURE 4 the lead is shown held at 11 by the jaws 12 of a suitable vise or tool. FIGURE 5 illustrates an array of substrates 13 to 15 in section, with a through connection established between the lead 16 terminating at substrate 13 and a lead 17 terminating at substrate 15, via a "dumbbell" shaped configuration 18, having contact protuberances 19 and 20 which connect to respective contact protuberances 21 and 22 at the ends of leads 16 and 17.

As indicated in FIGURE 5, the planar substrates when assembled into the required stacked array configuration are required to have predetermined spacings D. Thus, it is necessary that the sum of the lengths represented by the diameters of the spherical protuberances 19 and 21, and the sum of the diametric lengths of the spherical protuberances 20 and 22, be equal to D. It is interesting to note in this regard that the diameters of the protuberances 21 and 22 need not be identical so long as the corresponding diameters of the protuberances 19 and 20 are appropriately formed to make up the required spacing D. Thus, if it were desired to connect a very thin lead 16 to a relatively thicker lead 17 through the substrate 14, it would be feasible to form a relatively small diameter protuberance 21 which connects to a relatively large diameter protuberance 19 which in turn extends to a relatively small protuberance 20 which in turn contacts a relatively large protuberance 22; the result being that the terminating protuberance on the thin lead 16 may be kept to small dimensions relative to the protuberance terminating the lead 17. Those skilled in the metal working arts will of course appreciate that diameters of the terminating protuberances will be limited by the thickness of the lead. If the protuberance is too large in relation to the lead, breakage is likely to occur.

Referring to FIGURES 6 and 7, the "dumbbell" shaped configuration 18 of FIGURE 5 is formed by first extending a lead 23 through an aperture 24 in the substrate 14 leaving a predetermined length L of lead exposed. The extended portion of the lead is then heated to form the predetermined diameter protuberance 19 indicated in dotted outline in FIGURE 6, after which the remainder of the lead extending from the underside of the substrate 14 is cut at 25 leaving an extended end portion of length L′ which after heating assumes the spherical shape 20 shown in dotted outline in FIGURE 7.

Another connection and spacing contact structure illustrated in FIGURE 8 involves the bridging of two leads 27 and 28 terminating at the same planar substrate 29. This is accomplished by providing a "staple" form of connecting element 30 in an adjacent planar substrate 31, having spherical protuberances 32 and 33 which respectively contact corresponding protuberances 34 and 35 on the leads 27 and 28. As indicated in FIGURE 8, the portion 36 of the element 30, at the underside of substrate 31, is made thin enough to avoid contact with the protuberances 37 extending from adjacent substrate 38.

The formation of the element 30, as indicated in FIGURES 9 and 10, involves the extension of a lead 39 through appropriate apertures in the substrate 31, the ends of which are cut to provide a U shaped configuration as shown in FIGURE 9. Thereafter the heat of a welding torch is locally applied to the lead ends 32 and 33 as indicated at 40 in FIGURE 10, thereby forming spherical contact protuberances 32 and 33 as shown in FIGURE 8.

FIGURE 11 indicates in schematic form an assembled circuit package comprising a vertically stacked array of magnetic core planes, each supported in a frame. FIGURE 11 shows a magnetic core matrix assembly, a detail of which is shown in section in FIGURE 12. As is well known to those familiar with such devices, a magnetic core assembly generally comprises a plurality of stacked magnetic core planes each containing a planar array of magnetic cores which are threaded by leads terminating in printed circuits bounding the stacked core frames such as the printed circuits shown at 41. As indicated in FIGURE 12, the access and sensing leads threading the magnetic cores are brought through appropriate apertures 42 in each core frame 40, and are terminated in integral spherical contact protuberances 43, in the manner described above, which, together with contact protuberances 44 extending from printed circuit panel 41, precisely fill the predetermined space between the printed circuit panel and the stack of core frames.

Figure 14:
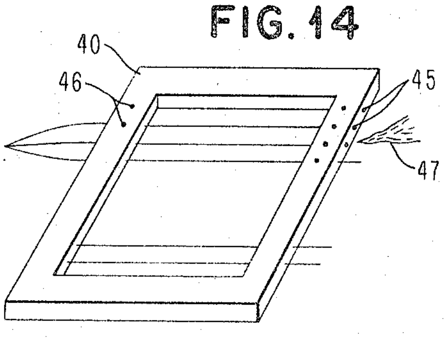

As indicated in FIGURE 14, the wires threading each core frame 40 are extended either through lateral apertures 45 extending toward the printed circuit panel, or through vertical apertures 46 extending towards an adjacent frame. Then, as indicated in FIGURE 14, a welding torch flame 47 is passed, at a predetermined rate, across the extending portions of the wires, while the wires are simultaneously held clamped to prevent movement thereof. Thus, spherical contact protuberances of predetermined diameter are formed extending both from the lateral apertures 45 and vertical apertures 46 of the core frame. The lateral extensions serve as spacers and contacts extending to contact protuberances on the printed circuit panel 41 while the vertical protuberances establish spaced contact connections to adjacent core frames. Thus, the frames together with the extending protuberances determine and conform to predetermined spacing requirements. It should be noted that while the leads threading the core frames are thin filaments, the diameters of the contact protuberances may be an order of magnitude larger than the diameters of the leads; for example, two and a half times greater.

Where a permanent electrical connection is required to be established between contact protuberances (see FIGURES 5, 8, and 12) it is desirable to fuse the protuberances together by employing a welding or solder reflowing technique as described below. The solder reflow technique is shown in FIGURE 12 and simply involves deposition of a thin solder coating on each formed protuberance, at a temperature below the flowing point of the protuberance material, followed by reheating of connecting protuberances to reflow the solder so as to bring the protuberances into tangential contact and to fill the space between the protuberances with solder. If the mating protuberances are not accessible for direct application of heat to the solder coatings, they may be baked in an oven or an electric current of suitable amplitude can be passed through the juncture to produce a solder union by resistance heating at the protuberance interfaces.

Alternatively, direct welding connections might be made; for example, where protuberances composed of dissimilar metals are employed. It has been determined, with reference for example to the contact configuration shown in FIGURE 5, that a "dumbbell" connector composed of a conductive brazing material that is self-wetting to copper will make quite satisfactory welding connections between contacts composed of copper. In one particular instance it has been determined that a welding contact protuberance 0.0345 inch in diameter, could be formed by extending a length of 0.245 inch of the above-mentioned brazing material, in the form of a cylindrical filament 0.010 inch in diameter, through a 0.020 inch aperture in a supporting substrate, and thereafter heating the extended portion to the liquid point until the forming sphere makes contact with the edges of the aperture. At this point the heat is immediately removed and the required spherical dimensions are established.

Where extremely close contact diameter tolerances are specified it might be desirable to form spheres of slightly larger diameter and to thereafter lap or otherwise treat the spheres to controllably reduce their heights by minute amounts.

While there have been shown and described above the fundamental novel features of the invention as it pertains to the construction of a planar array of miniature electrical circuits, those skilled in the art will appreciate that there are many other applications for the technique just described. For example, it would be a relatively simple matter to provide a miniature movable circuit panel having mounted thereon a plurality of "staple" members which have contact protuberances of different predetermined diameters and which are designed to engage protuberances having complementary diameters on a fixed circuit panel for establishing selective connections between protuberances on the fixed panel. Such an arrangement could, for example, be used as a combination locking mechanism or multiple switching device, or the like. It should therefore be understood that various omissions, substitutions and changes may be made in the form and details of the arrangements described above without departing from the true spirit and scope of the invention. It is the intention therefore to be limited in scope only as indicated by the following claims.

What is claimed is:

1. The method of forming a mechanically secure contact protuberance of predetermined dimensions integral with the end of a conductive member comprising the steps of:

providing a metallic conductive member, forming an aperture, in a supporting ceramic substrate, capable of snugly receiving said conductive member;

inserting a predetermined length of said conductive member through said aperture;

clamping said conductive member to prevent movement thereof relative to said supporting substrate;

flame heating said member at one end thereof to form a spherical contact protuberance of predetermined diameter at one surface of said substrate;

removing said clamping;

cutting said conductive member to form an opposed end of predetermined length opposite said contact protuberance;

and flame heating said predetermined length of said opposed end to form a spherical contact protuberance adjacent to the opposite surface of said substrate.

2. The method of mass producing spacing and connecting contacts in arrays of precisely spaced planar elements having circuits comprising the steps of:

providing insulating non-wetting elements having apertures, arranging metallic leads in the apertures with each lead having two projecting lengths, forming spherical contact protuberances having predetermined diameters from the projecting lengths with the protuberances extending from the elements by flame heating and solidifying; and joining and electrically connecting corresponding protuberances extending from adjacent planar elements and having combined diameters corresponding to a required predetermined spacing between said adjacent elements.

3. The method of forming a stacked array of planar elements having elements with predetermined spacing between said circuits and with electrical contact connections between said elements conforming to said predetermined spacing and having a minimum number of resistive interfaces in each contact connection comprising the steps of:

arranging metallic leads in the apertures with each lead having two projecting lengths, forming spherical contact protuberances of precisely determined diameter from the projecting lengths with the protuberances extending from the elements by flame heating and solidifying, such that the sum of the diameters of connecting contact protuberances, on different elements which are required to be spaced at a predetermined distance from each other equals said predetermined distance;

positioning said elements in spaced relationship to each other at said required predetermined distance; and uniting and electrically connecting said corresponding spherical contact protuberances.

4. The method of forming a securely mounted array of electrical connected substrates with predetermined spacing comprising the steps of:

forming apertures in supporting insulating substrates having non-wettable surfaces;

extending predetermined lengths of conductive leads through said apertures near said non-wetting surfaces;

heating both said extending predetermined lengths of each of said leads to the fluid state to form spherical protuberances of predetermined diameters greater than the diameters of said apertures and solidifying the protuberances;

lapping the tops of said spherical protuberances to remove minute portions of material therefrom to precisely vary the heights thereof relative to said substrate; and joining and electrically connecting said lapped protuberances to similarly formed corresponding protuberances extending from at least one other substrate.

References Cited by the Examiner

UNITED STATES PATENTS

| | | | |
|---|---|---|---|
| 2,162,234 | 6/1939 | Thomas | 65—68 |
| 2,376,397 | 5/1945 | Spencer | 29—522 |
| 2,989,578 | 6/1961 | Wagner et al. | 29—155.55 X |
| 3,148,310 | 9/1964 | Feldman | 29—155.5 X |
| 3,191,271 | 6/1965 | Johnson | 29—155.55 |

JOHN F. CAMPBELL, *Primary Examiner.*

R. W. CHURCH, *Assistant Examiner.*